United States Patent [19]
Scoggins et al.

[11] 3,865,794

[45] Feb. 11, 1975

[54] ARYLENE SULFIDE POLYMERS

[75] Inventors: Lacey E. Scoggins; James T. Edmonds, Jr., both of Bartlesville, Okla.

[73] Assignee: Phillips Petroleum Company, Bartlesville, Okla.

[22] Filed: Nov. 19, 1973

[21] Appl. No.: 416,780

[52] U.S. Cl. .................................. 260/79.1, 260/79
[51] Int. Cl. ............................................ C08g 23/00
[58] Field of Search ............................ 260/79, 79.1

[56] References Cited
UNITED STATES PATENTS
3,763,124  10/1973  Edmonds, Jr. ...................... 260/79.1
3,786,035  1/1974  Scoggin ............................. 260/79.1

Primary Examiner—Melvyn I. Marquis

[57] ABSTRACT

A method of producing arylene sulfide polymers employing (1) polyhalo-substituted aromatic compounds; (2) thiosulfates selected from lithium, sodium, potassium, rubidium, cesium, magnesium, calcium, strontium and barium thiosulfates; (3) bases selected from the hydroxides of lithium, sodium, potassium, rubidium, cesium, magnesium, calcium, strontium and barium and the carbonates of sodium, potassium, rubidium and cesium; and, (4) organic amides.

14 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkaki metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one thiosulfate selected from lithium, sodium, potassium, rubidium, cesium, magnesium, calcium, strontium and barium thiosulfates, at least one base selected from the hydroxides of lithium, sodium, potassium, rubidium, cesium, magnesium, calcium, strontium and barium and the carbonates of sodium, potassium, rubidium and cesium and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Thiosulfates which can be employed in the process of this invention include those of lithium, sodium, potassium, rubidium, cesium, magnesium, calcium, strontium, and barium.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the thiosulfate, the base and the organic amide or which can be present in a composite formed from the thiosulfate, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the thiosulfate, the base and the organic amide is maintained at polymerization conditions to produce the arylene sulfide polymer.

The ratio of reactants can vary considerably but about 0.9 to about 2, and preferably about 0.95 to about 1.2, gram-moles of the polyhalo-substituted aromatic compound will generally be employed per gram-mole of thiosulfate. The base generally will be employed in an amount within the range of from about 1.5 to about 5, and preferably from about 1.8 to about 4, gram-equivalents per gram-mole of thiosulfate. As used herein, one gram-equivalent of the hydroxides of magnesium, calcium, strontium and barium represents the same amount as one-half gram-mole of these substances, whereas for the hydroxides of lithium, sodium, potassium, rubidium, and cesium, or for the carbonates of sodium, potassium, rubidium, and cesium, the amount represented by one gram-equivalent is considered to be the same as that represented by 1 gram-mole.

The amount of organic amide employed can also vary over a wide range but will generally be within the range of from about 100 grams to about 2500 grams per gram-mole of polyhalo-substituted aromatic compound employed.

The temperature at which the polymerization can be conducted can vary over a wide range and will generally be within the range of from about 125°C. to about 450°C. and preferably within the range of from about 175°C. to about 350°C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480°C. in the presence of a free oxygen-containing gas, to provide cured products having high thermal stability and good chemical resistance. They are useful in the production of coatings, films, molded objects and fibers.

The foregoing statements are based upon the following examples.

EXAMPLES

In the following examples, values for inherent viscosity were determined at 206°C. in 1-chloronaphthalene at a polymer concentration of 0.4 g/100 ml solution.

EXAMPLE I

The following example is within the scope of this invention.

A mixture of 474.4 g (3 moles) anhydrous sodium thiosulfate, 240 g (6 moles) sodium hydroxide, and 1500 ml (1539 g) N-methyl-2-pyrrolidone was heated to 218°C. in a stirred reactor. A solution of 441 g (3 moles) p-dichlorobenzene in 300 ml (308 g) N-methyl-2-pyrrolidone was pressured with nitrogen into the reactor. A temperature rise to 266°C. was obtained. The temperature was lowered and controlled at 246°C. for 3 hours at a pressure of about 130 psig. A brown mixture containing polymer was drained from the reactor. Deionized water was added to the mixture, and the polymer was filtered, washed four times with deionized water, and four times with acetone. The resulting polymer was vacuum dried overnight at 110°C. to obtain 198 g (61.5 percent yield) of poly(p-phenylene sulfide) having an inherent viscosity of 0.05. A mixture consisting of 60 parts by weight of the polymer, 20 parts by weight titanium dioxide, and 150 parts by weight propylene glycol was applied as three coats to a carbon steel substrate, the polymer being cured by heating at 371 C. for 30 minutes after the application of each coating, to produce a final coating which was insoluble in common solvents.

EXAMPLE II

The following example is within the scope of this invention.

A mixture of 248.18 g (1 mole) sodium thiosulfate pentahydrate, 100 ml deaerated water, 83 g (2.07 moles) sodium hydroxide, and 400 ml (410 g) N-methyl-2-pyrrolidone was charged to a stirred reactor fitted for distillation. Approximately 188 ml of water was distilled from the reactor upon heating to a temperature of 160°C. A solution of 152 g (1.04 moles) p-dichlorobenzene in 150 ml (154 g) N-methyl-2-pyrrolidone was pressured with nitrogen into the reactor following the distillation. The temperature was raised to 246°C., whereupon the pressure was 180 psig. The temperature was then maintained at 246°C. for 3 hours, the pressure being maintained at 180 to 230 psig by venting as required. The reactor contents were mixed with water, and the polymer was filtered and washed four times with water and one time with acetone, then vacuum dried at 82°C. overnight to obtain 45 g (41.6 percent yield) of poly(p-phenylene sulfide) having an inherent viscosity of 0.03.

EXAMPLE III

A mixture of 248 g (1 mole) sodium thiosulfate pentahydrate, 94 g (2.35 moles) sodium hydroxide, 200 ml deionized water, and 800 ml (821 g) N-methyl-2-pyrrolidone was charged to a stirred reactor equipped for distillation. Approximately 267 ml of water was distilled from the solution upon heating to a temperature of 160°C. The reactor was closed, and 150 g (1.02 moles) p-dichlorobenzene in 400 ml (410 g) N-methyl-2-pyrrolidone was pressured with nitrogen into the reactor. The reactor temperature was then increased to 246°C., where it was maintained for 3 hours while the pressure was within the range of 180 to 320 psig. The cooled reactor contents were then mixed with water, and the polymer was filtered and washed four times with water and one time with acetone. The washed polymer was vacuum dried overnight at 82°C. to obtain 72 g (67 percent yield) of poly(p-phenylene sulfide) having an inherent viscosity of 0.02. The infrared spectrum of the poly(p-phenylene sulfide) was essentially the same as that produced through use of p-dichlorobenzene, sodium sulfide, and N-methyl-2-pyrrolidone in accordance with the method of U.S. Pat. No. 3,354,129.

A mixture of the polymer produced in Example III consisting of 60 parts by weight of the polymer, 20 parts by weight titanium dioxide, and 150 parts by weight propylene glycol was applied as three coats to a carbon steel substrate, the polymer being cured by heating at 371°C. for 30 minutes after the application of each coating, to produce a final coating which was tough, flexible, and insoluble in common solvents.

It will be evident from the foregoing that various modifications can be made to the method of this invention. Such are considered, however, to be within the scope thereof.

What is claimed is:

1. A method of producing a polymer which comprises:
   a. forming a composition by contacting at least one polyhalo-substituted aromatic compound, wherein the halogen atoms are attached to aromatic ring carbon atoms, at least one thiosulfate selected from the group consisting of lithium thiosulfate, sodium thiosulfate, potassium thiosulfate, rubidium thiosulfate, cesium thiosulfate, magnesium thiosulfate, calcium thiosulfate, strontium thiosulfate and barium thiosulfate, at least one base selected from the hydroxides of lithium, sodium, potassium, rubidium, cesium, magnesium, calcium, strontium, and barium and the carbonates of sodium, potassium, rubidium and cesium and at least one organic amide; and,
   b. maintaining at least a portion of said composition at polymerization conditions to produce said polymer.

2. The method of claim 1 in which said polyhalo-substituted aromatic compound is employed in an amount within the range of from about 0.9 to about 2 gram-moles per gram-mole of said thiosulfate.

3. The method of claim 1 in which said base is employed in an amount within the range of from about 1.5 to about 5 gram-equivalents per gram-mole of said thiosulfate.

4. The method of claim 2 in which said organic amide is employed in an amount within the range of from about 100 grams to about 2500 grams per gram-mole of polyhalo-substituted aromatic compound.

5. The method of claim 1 in which said polyhalo-substitued aromatic compound is p-dichlorobenzene, said thiosulfate is sodium thiosulfate, said organic amide is N-methyl-2-pyrrolidone and said base is sodium hydroxide.

6. The method of claim 1 in which said thiosulfate is sodium thiosulfate pentahydrate and water is removed from said composition prior to maintaining said composition at polymerization conditions.

7. The method of claim 1 in which water is removed from said composition prior to maintaining said composition at polymerization conditions.

8. A method of producing a polymer which comprises:
   a. contacting at least one thiosulfate, at least one base and at least one organic amide to form a first composition, said thiosulfate being selected from the group consisting of lithium thiosulfate, sodium thiosulfate, potassium thiosulfate, rubidium thiosulfate, cesium thiosulfate, magnesium thiosulfate, calcium thiosulfate, strontium thiosulfate and barium thiosulfate, said base being selected from the hydroxides of lithium, sodium, potassium, rubidium, cesium, magnesium, calcium, strontium and barium and the carbonates of sodium, potassium, rubidium, and cesium;
   b. contacting at least a portion of said first composition with at least one polyhalo-substituted aromatic compound wherein the halogen atoms are attached to aromatic ring carbon atoms to form a second composition; and,
   c. maintaining said second composition at polymerization conditions to form said polymer.

9. The method of claim 8 in which said polyhalo-substituted aromatic compound is employed in an amount within the range of from about 0.9 to about 2 gram-moles per gram-mole of said thiosulfate.

10. The method of claim 8 in which said base is employed in an amount within the range of from about 1.5 to about 5 gram-equivalents per gram-mole of said thiosulfate.

11. The method of claim 9 in which said organic amide is employed in an amount within the range of from about 100 grams to about 2500 grams per gram-mole of polyhalo-substituted aromatic compound.

12. The method of claim 8 in which said polyhalo-substituted aromatic compound is p-dichlorobenzene, said thiosulfate is sodium thiosulfate, said organic amide is N-methyl-2-pyrrolidone and said base is sodium hydroxide.

13. The method of claim 8 in which said thiosulfate is sodium thiosulfate pentahydrate and water is removed from said first composition.

14. The method of claim 8 in which water is removed from said first composition.

* * * * *